United States Patent
Martin (10) Patent No.: US 6,981,734 B2
(45) Date of Patent: Jan. 3, 2006

(54) TARPAULIN SYSTEM FOR AN OPEN-TOP CARGO HOLD

(75) Inventor: William P. Martin, Hoffman Estates, IL (US)

(73) Assignee: Mountain Tarp and Awning, Inc., Middlesboro, KY (US)

( * ) Notice: Subject to any disclaimer, the term of this patent is extended or adjusted under 35 U.S.C. 154(b) by 16 days.

(21) Appl. No.: 10/766,794

(22) Filed: Jan. 27, 2004

(65) Prior Publication Data

US 2004/0195858 A1    Oct. 7, 2004

Related U.S. Application Data

(60) Provisional application No. 60/443,094, filed on Jan. 28, 2003.

(51) Int. Cl.
*B60P 7/02*     (2006.01)

(52) U.S. Cl. .................. 296/100.12; 296/100.01; 296/100.11; 296/100.17; 296/100.18

(58) Field of Classification Search .......... 296/100.01, 296/100.11, 100.12, 100.17, 100.18

See application file for complete search history.

(56) References Cited

U.S. PATENT DOCUMENTS

| | | | | |
|---|---|---|---|---|
| 5,050,923 A | * | 9/1991 | Petelka | 296/100.18 |
| 5,938,270 A | * | 8/1999 | Swanson et al. | 296/100.11 |
| 6,142,554 A | * | 11/2000 | Carroll et al. | 296/100.12 |
| 2003/0067185 A1 | * | 4/2003 | Gothier et al. | 296/100.11 |

* cited by examiner

*Primary Examiner*—Lori L. Coletta
(74) *Attorney, Agent, or Firm*—Sand & Sebott (57) ABSTRACT

A tarpaulin system for an open cargo hold for a vehicle and a method for repairing the tarpaulin system. The tarpaulin system includes a tarpaulin with a number of ribs or bows releasably connected along its length. A movable cable is provided on the cargo hold and the bows are releasably connected to this cable by brackets. The brackets have mounting flanges and cable followers, the mounting flanges being releasably connected to the bows and the cable followers being releasably connected to the cable. When the cable is drawn toward the rear of the cargo hold, the brackets and the bows and tarpaulin connected thereto are drawn toward the rear end of the cargo hold. When the cable is drawn toward the front of the cargo hold, the brackets and therefore the bows and tarpaulin, are drawn toward the front of the cargo hold. If a bow or connecting bracket breaks within the tarpaulin system, it may be disconnected from the tarpaulin and the cable and a replacement component may be reconnected to both the tarpaulin and the cable without disassembly of the entire tarpaulin system.

25 Claims, 9 Drawing Sheets

TARPAULIN SYSTEM FOR AN OPEN-TOP CARGO HOLD

BACKGROUND OF THE INVENTION

1. Technical Field

This invention generally relates to a system for protecting goods during transportation. More particularly, the invention relates to a tarpaulin system for open top cargo holds. Specifically, the invention relates to a detachable mechanism for securing a tarpaulin system to a vehicle.

2. Background Information

In the past, trucks with open top cargo holds, such as dump trucks, have needed to be covered occasionally to either protect the cargo from rain or prevent the cargo from flying off the truck as the vehicle travels along the roadways. The traditional method for accomplishing this has been to cover the cargo with a tarpaulin. Typically, a series of bows or ribs, i.e., bowed or slightly convex pieces of wood, fiberglass or steel, has been used to keep the tarpaulin from lying in direct contact with the load in the truck. The front end of the tarpaulin has been attached to an assembly mounted either onto the truck cab or the front end of the bed and the back end of the tarpaulin has been connected to an end bow. The end bow is connected to a motorized system that allows the tarpaulin to be drawn toward the back end of the bed to cover the load or withdrawn toward the front end of the bed to uncover the load. The motorized system has included a continuous cable that connects a drive wheel, mounted near the front end of the bed, to a follower wheel mounted near the back end of the bed. A motor rotates the drive wheel causing the cable to move around the drive wheel and follower wheel. The end bow is connected to the cable so that as the cable is moved, the tarpaulin is drawn either toward the front end of the bed or toward the back end of the bed. A number of other bows are positioned between the end bow and the front end of the tarpaulin. These other bows are connected to the tarpaulin but are not connected to the cable. When the cable moves the end bow toward the front end of the bed, the tarpaulin is collapsed accordion-style with the bows butting up to each other. When the cable moves the end bow toward the back end of the truck bed, the tarpaulin is drawn over the cargo hold and the end bow and other bows keep the tarpaulin a spaced distance off the load.

This system works well until one of the bows breaks. When this happens, the entire tarpaulin/bow system, including the cable, has to be dismantled so that the broken or damaged bow can be replaced. This job may take two men up to twelve hours to complete.

There is consequently a need in the art for an improved system for connecting a tarpaulin to a truck and for an improved method of replacing broken or damaged bows with ease and speed.

SUMMARY OF THE INVENTION

A tarpaulin system for an open cargo hold for a vehicle and a method for repairing the tarpaulin system are disclosed. The tarpaulin system includes a tarpaulin with a number of ribs or bows releasably connected along its length. One side of the tarpaulin is connected proximate one end of the cargo hold so that one side does not move as the rest of the tarpaulin is moved back and forth across the cargo hold. A movable cable is provided on either the vehicle or the cargo hold and the bows are releasably connected to this cable by a plurality of brackets. The brackets include mounting flanges and cable followers, the mounting flanges being releasably connected to the bows and the cable followers being releasably connected to the cable. When the cable is drawn toward the rear of the cargo hold, the brackets, the bows and the tarpaulin that are connected thereto are drawn toward the rear end of the cargo hold. When the cable is drawn toward the front of the cargo hold, the brackets, bows and tarpaulin are drawn toward the front of the cargo hold. The cable is driven by a motor. If a bow or connecting bracket breaks within the tarpaulin system, it may be disconnected from the tarpaulin and the cable and a replacement component may be reconnected to both the tarpaulin and the cable without disassembly of the entire tarpaulin system.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

DETAILED DESCRIPTION OF THE INVENTION

Figure 1:
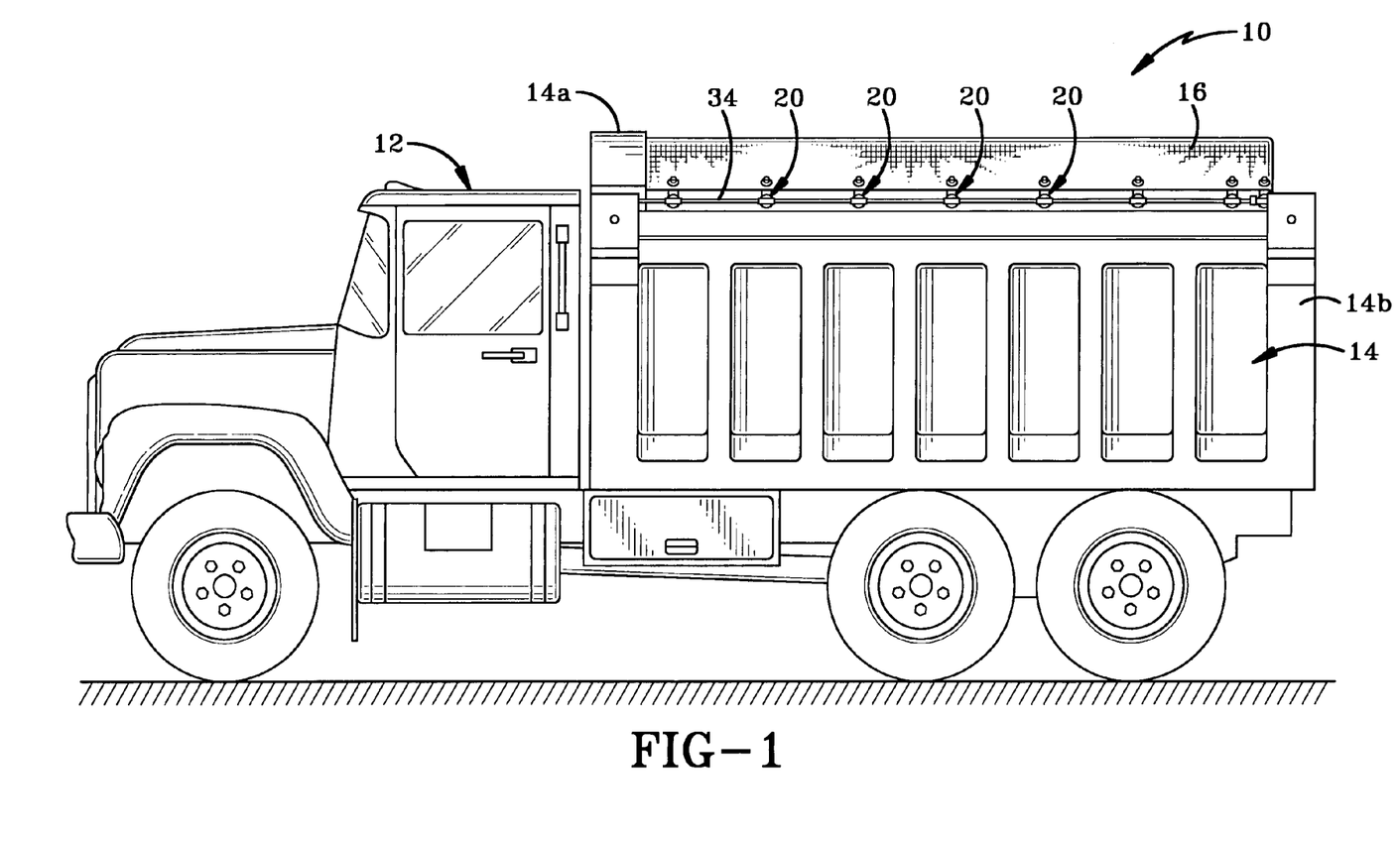
FIG. 1 is a side view of a truck having an improved tarpaulin system mounted thereon.
Figure 2:
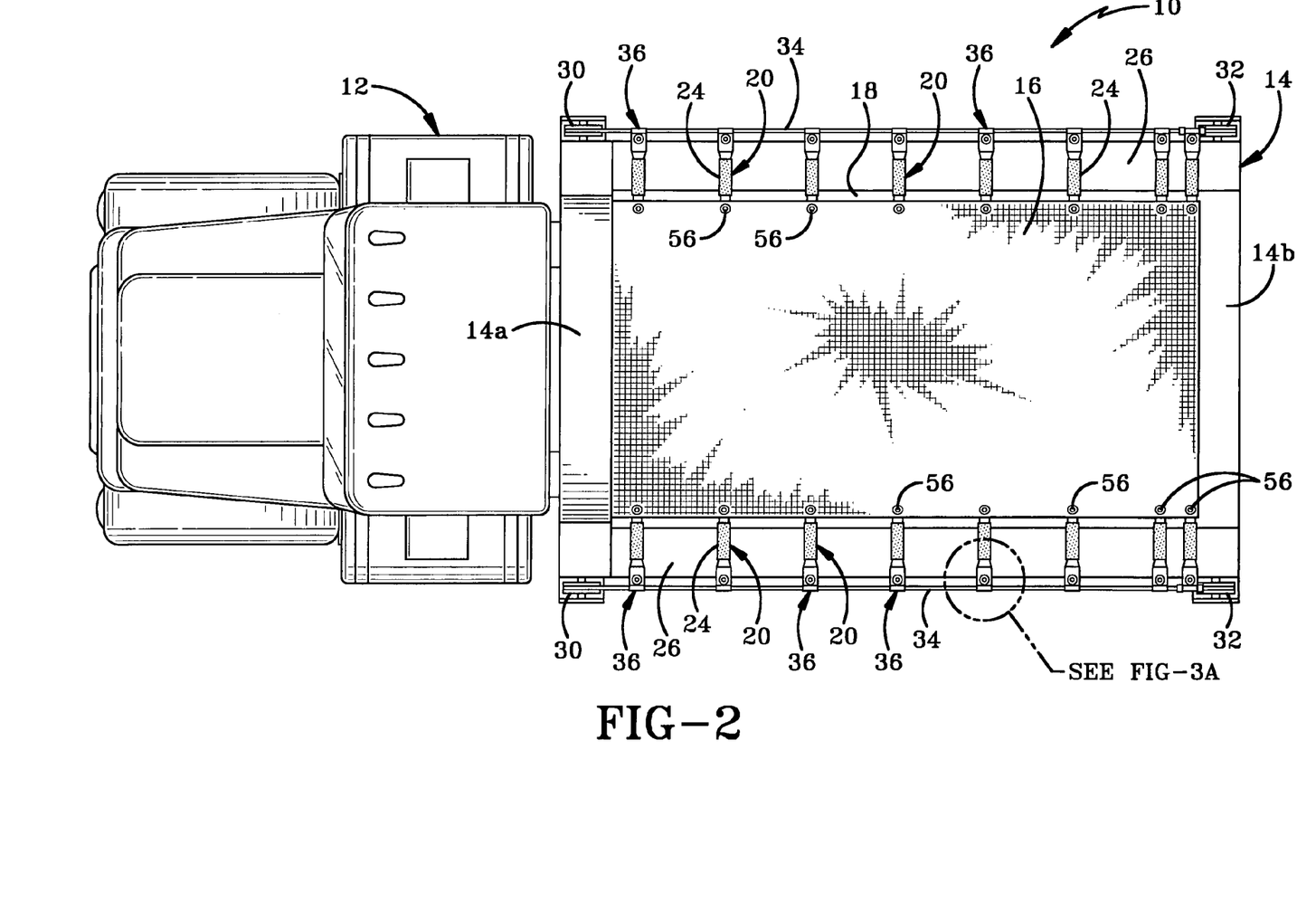
FIG. 2 is a top view of a truck of FIG. 1 showing the improved tarpaulin system.

Referring to FIGS. 1 & 2, there is shown a truck 10, generally indicated at 10 having a cab 12 and a bed 14. While truck 10 as illustrated is a dump truck, any other suitable type of vehicle having an open cargo hold type of bed may utilize the present invention, including vehicles such as train cars. A tarpaulin 16 is provided for selectively covering open cargo hold 18 of bed 14. A plurality of ribs or bows 20 are connected to tarpaulin 16 to draw tarpaulin 16 over cargo hold 18 and to assist in holding tarpaulin 16 off the load (not shown) carried in cargo hold 18. Tarpaulin 16 preferably is fixedly connected to front end 14a of bed 14 or to an assembly 22 proximate front end 14a of bed 14 as later described herein with reference to FIG. 9.

Figure 3:
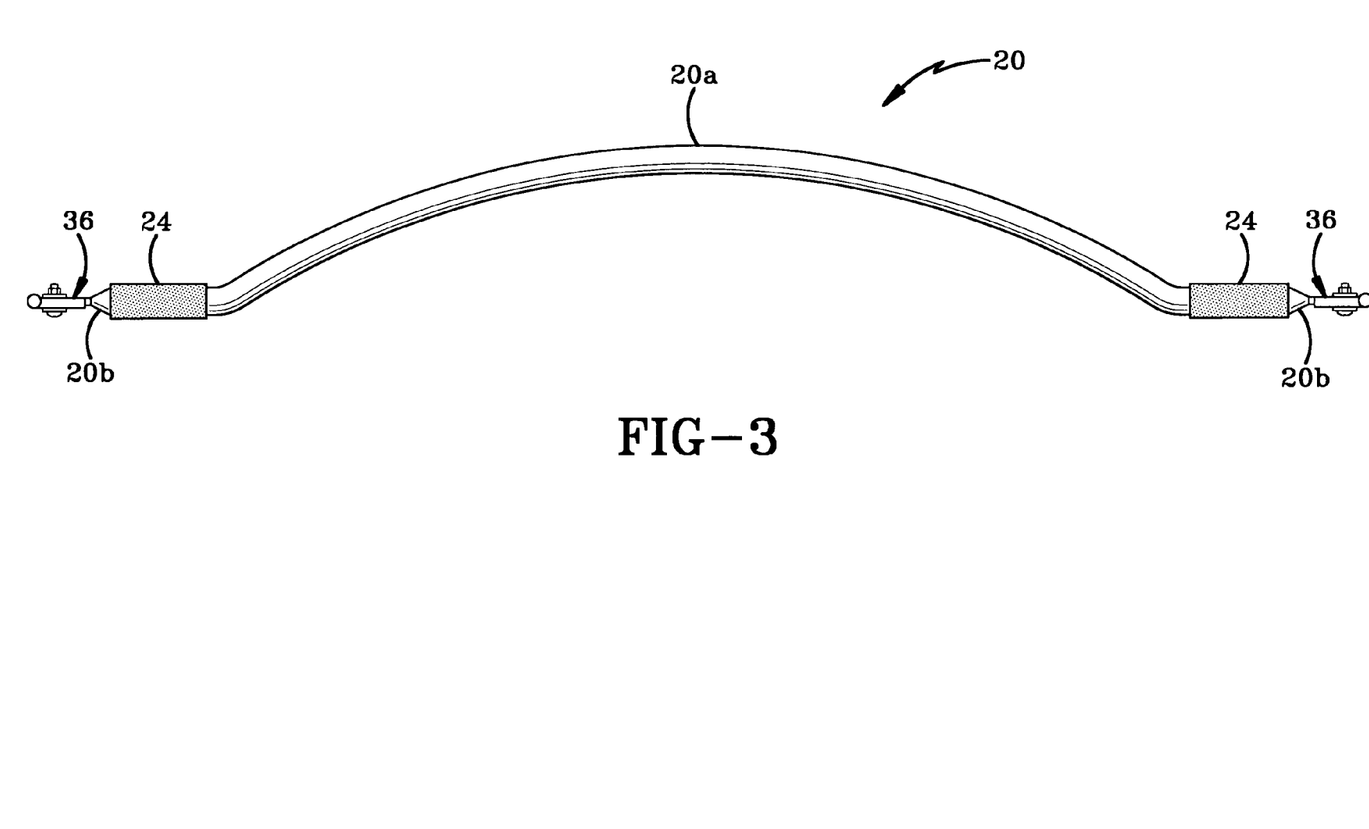
FIG. 3 is a side view of a bow of the tarpaulin system.
Figure 3A:
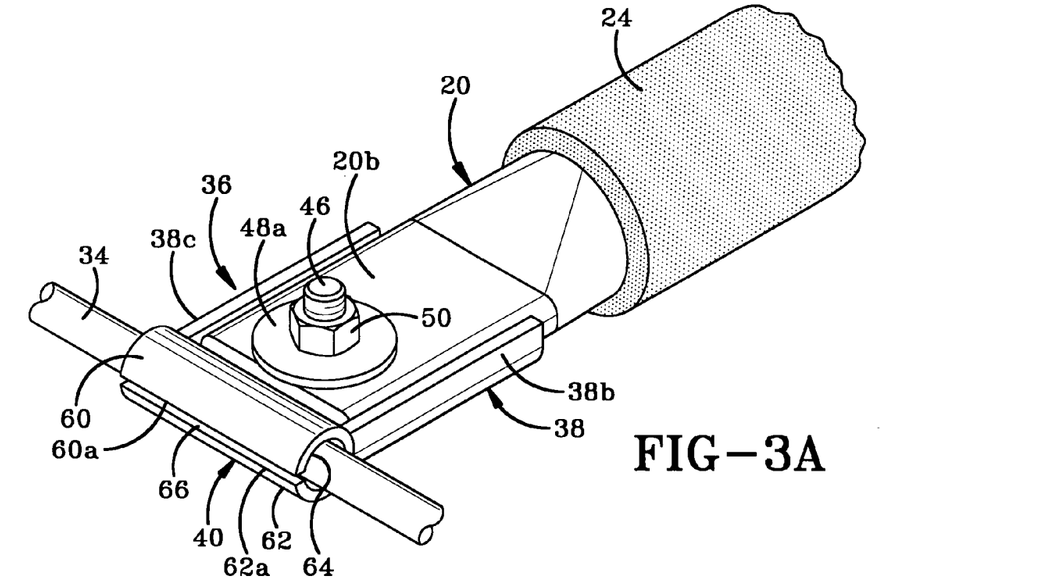
FIG. 3a is a perspective view of the bow bracket for the tarpaulin system.

Bows 20 are shown in greater detail in FIG. 3A. Bows 20 may be manufactured from any suitable material such as wood, fiberglass aluminum or steel. Bows 20 preferably have a convexly shaped interior section 20a with thinner, flattened ends 20b on either side of interior section 20a. A sleeve 24 is provided proximate ends 20b to allow them to glide relatively smoothly over edges 26 of cargo hold 18.

Sleeve 24 may be manufactured from foam rubber, plastic or any other suitable material. Interior section 20a of bows 20 may be received within spaced-apart fabric sleeves (not shown) provided on the underside of tarpaulin 16.

Figure 4:
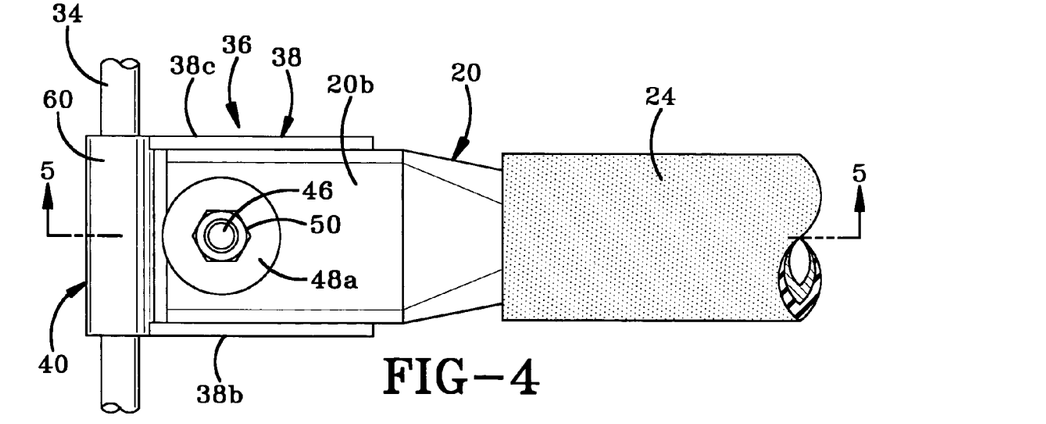
FIG. 4 is a plan view of the bow bracket of FIG. 3.
Figure 5:
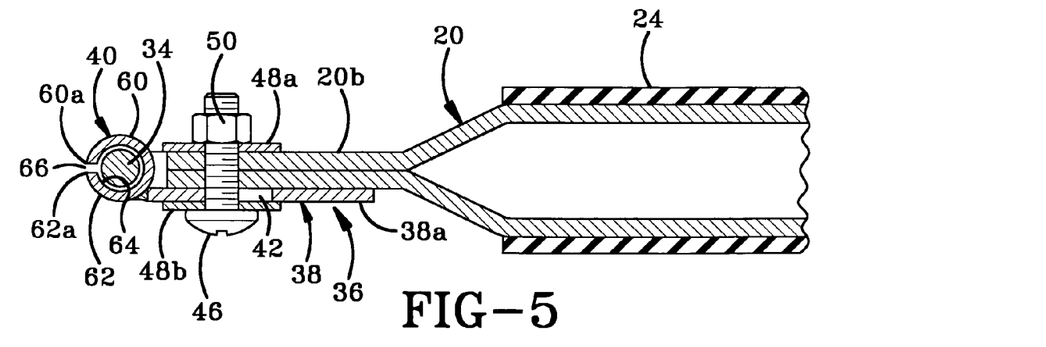
FIG. 5 is a cross-sectional side view of the bow bracket of FIG. 3.
Figure 6:
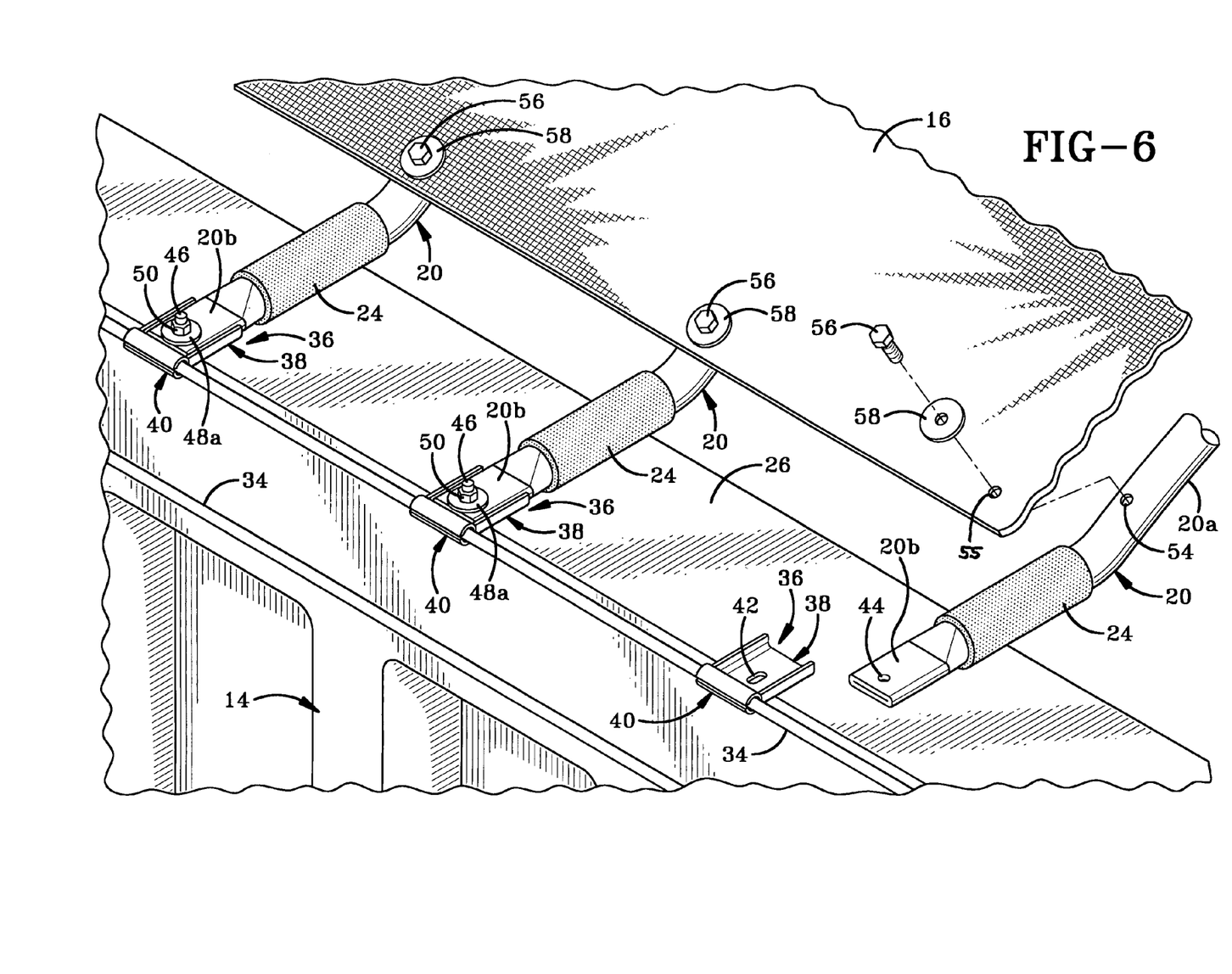
FIG. 6 is a partial perspective view of the tarpaulin system showing the mechanism for connecting the bow bracket to the tarpaulin.

As may be most easily seen in FIGS. 4–6, interior section 20a of each bow 20 defines a first hole 54. Tarpaulin 16 includes a plurality of eyes 55 that are each alignable with a first hole 54 in a bow 20. When eyes 55 of tarpaulin 16 are aligned with first holes 54 of bows 20, bolts 56 are inserted through eyes 55 and first holes 54. A washer 58 may be disposed between each bolt 56 and tarpaulin 16 and a nut (not shown) engages bolt 56 to secure tarpaulin 16 and bow 20 together.

Figure 7:
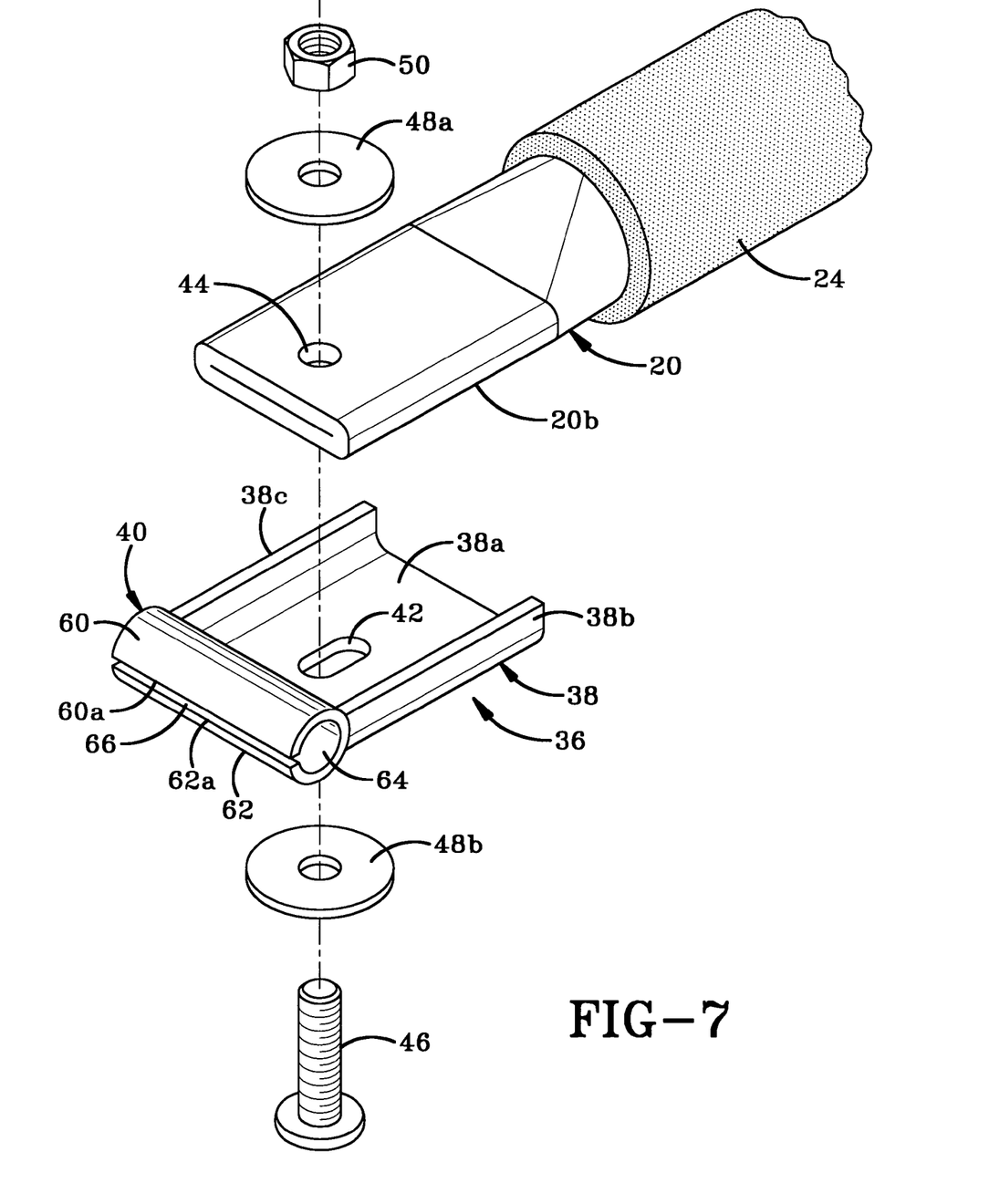
FIG. 7 is an exploded perspective view of the cable attachment end of the bow bracket.
Figure 8:
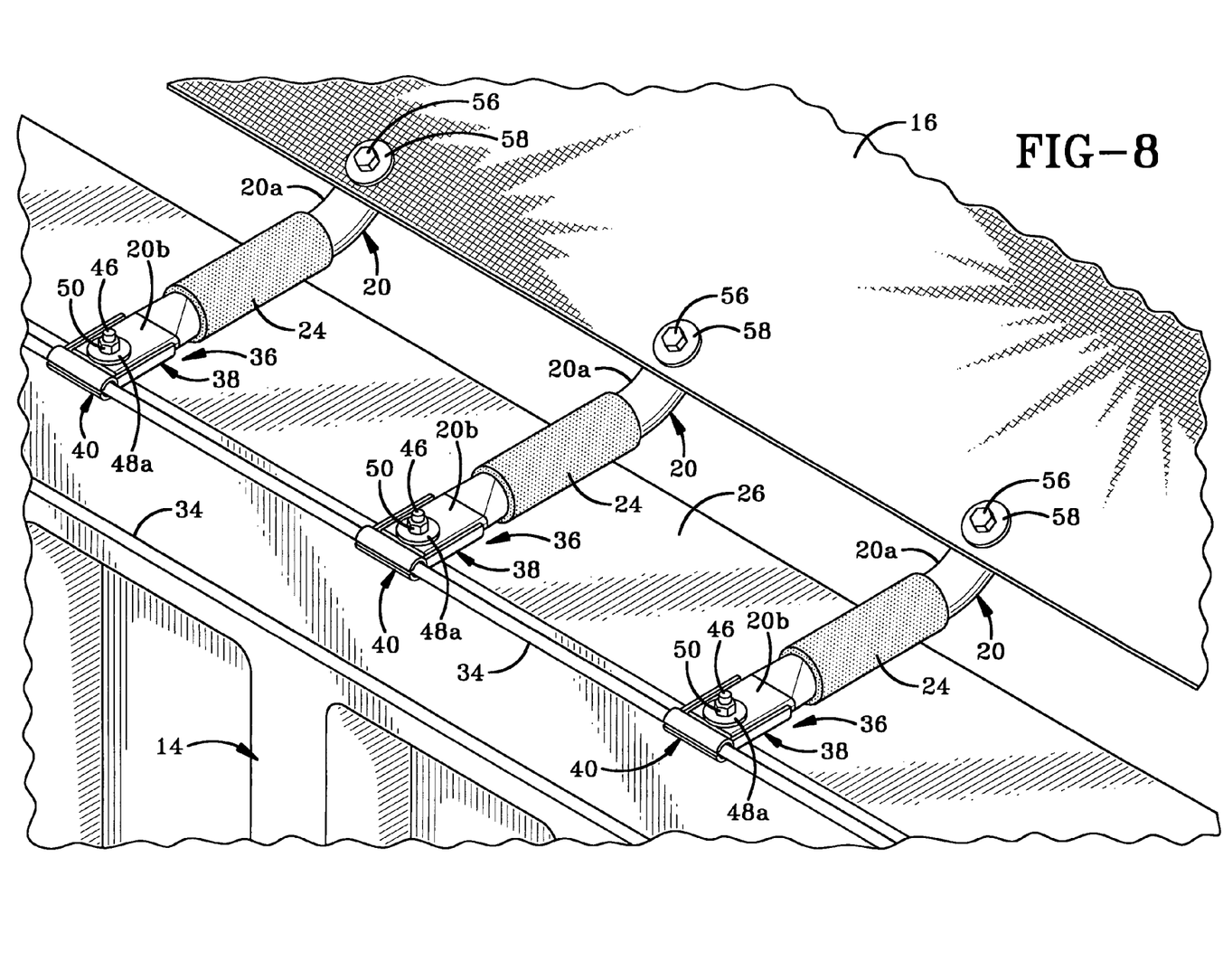
FIG. 8 is a partial perspective view of the tarpaulin system connected to the cable.

Referring still to FIGS. 4–6, a second hole 44 is provided spaced apart from first hole 54 in each bow 20. End 20b of each bow 20 connects to a movable cable 34 by way of a bracket 36. Bracket 36 includes a plurality of mounting flanges 38 for engaging end 20b of each bow 20, and a cable follower 40 for slidingly engaging cable 34. The longitudinal axis of mounting flange 38 is disposed substantially at right angles to the longitudinal axis of cable follower 40. Mounting flange 38 of each bracket 36 is generally U-shaped in cross section (FIG. 7) having a base 38a and generally parallel and spaced apart side walls 38b, 38c that extend upwardly and perpendicularly from base 38a. Mounting flange 38 is configured to receive end 20b of bow 20 thereon in a direction generally parallel to the longitudinal axis of base 38a. Base 38a defines an aperture 42 therein. Second holes 44 in bows 20 align with apertures 42 when ends 20b of bows 20 are received on mounting flanges 38. Bolts 46, washers 48a, 48b and nuts 50 are used to detachably secure mounting flanges 38 to ends 20b. Side walls 38b, 38c limit rotational motion of end 20b of bow 20 and also assist in ensuring that aperture 42 and second hole 44 are easily and quickly aligned.

Cable follower preferably is a clamp 40 that is generally C-shaped in cross-section (FIG. 5), having an upper section 60 and a lower section 62. Upper section 60 and lower section 62 define a cavity 64 therebetween. Terminal edges 60a, 62a of upper and lower sections 60, 62, are substantially parallel to each other and define a slot 66 therebetween. Slot 66 lies substantially parallel to the longitudinal axis of cable follower 40. Cavity 64 of cable follower 40 is configured to receive a continuous cable 34 through slot 66. Cable follower 40 clamps bracket 36 onto cable 34.

Figure 9:
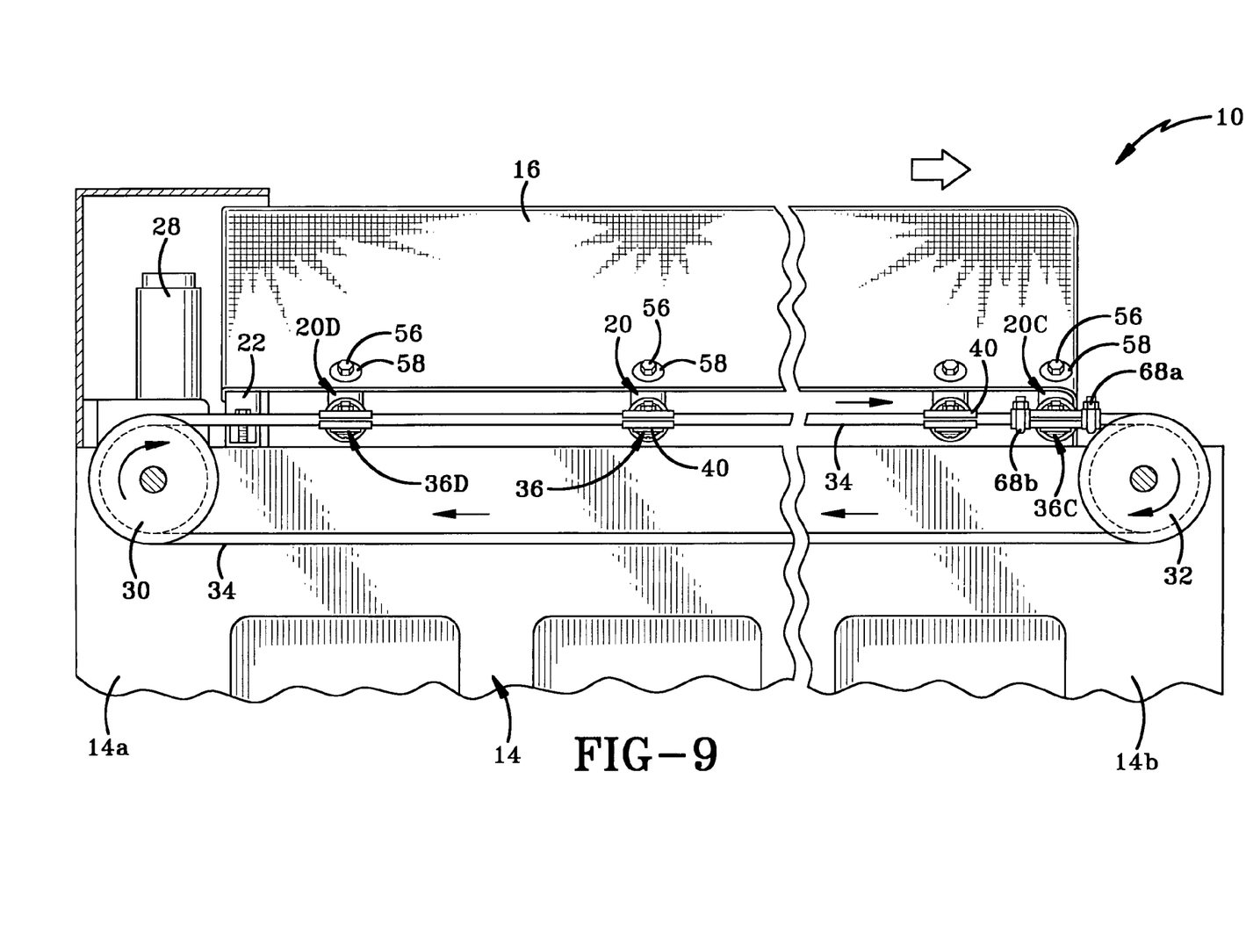
FIG. 9 is a partial side view of the system for moving the tarpaulin along the truck bed.
Figure 10:
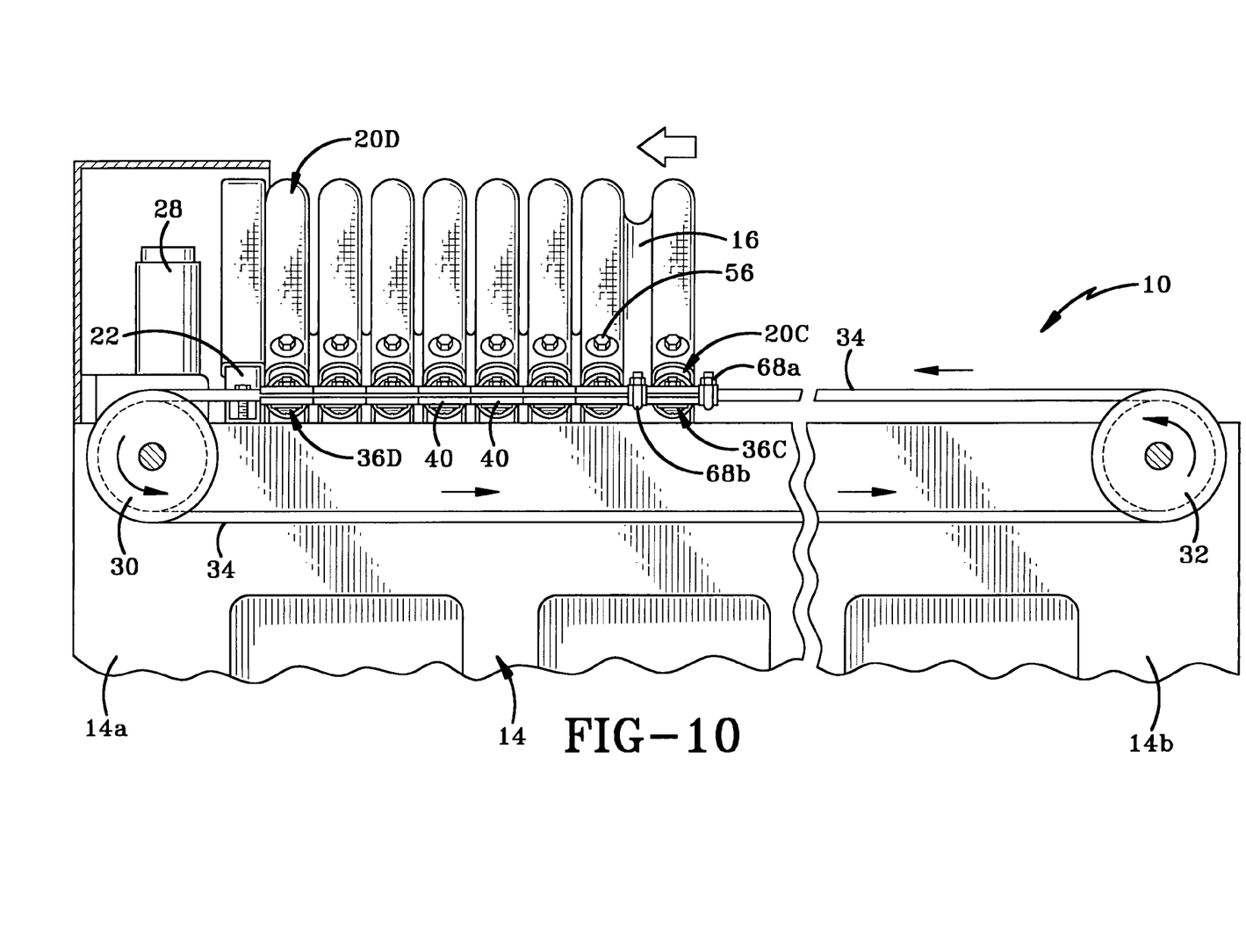
FIG. 10 is a partial side view of the tarpaulin system showing the tarpaulin withdrawn from covering the truck bed.

Referring to FIGS. 9 & 10, tarpaulin 16 is moved backward and forward over cargo hold 18 by cable 34. Cable 34 is connected to a motor 28 via a drive system. Drive system includes a drive wheel 30 disposed near front end 14a of bed 14; a follower wheel 32 disposed near back end 14b of bed 14 and continuous cable 34 is wound around connecting drive wheel 30 and follower wheel 32.

Referring to FIGS. 6, 9 and 10, in operation, at least one terminal bow 20C and a plurality of intermediate bows 20D are detachably connected to tarpaulin 16 (FIGS. 9 & 10). Bows 20C, 20D are inserted into fabric slots (not shown), if provided, on the underside of tarpaulin 16. A bolt 56 is inserted through washer 48, eye 55 in tarpaulin 16 and then into first hole 54 of bow 20C. A nut (not shown) is used to secure bolt 56 in position and thereby secure tarpaulin 16 and bow 20C together. Bow 20C is connected to cable 34 in the following manner. Each end 20b of bow 20C is inserted into mounting flange 38 of bracket 36C. A bolt 46 is passed through aperture 42 and second hole 44 in bow 20C after positioning washers 48a, 48b. Bolt 46 is secured into place by nut 50. Brackets 36C and 36D are attached to cable 34 by sliding cable follower 40 onto cable 34 with cable 34 entering cable follower 40 through slot 66. Cable follower 40 may then be crimped onto cable 34 by using pliers or some other suitable device to force upper section 60 and lower section 62 inwardly toward each other. This crimping narrows the distance between edges 60a and 62a so that the width of slot 52 is reduced and thereby preventing cable 34 from being withdrawn from cable follower 40. Bows 20C and 20D are connected to cable 34 in a similar manner, but cable followers 40 for bows 20C and 20D are not crimped to the same degree that bracket 36C is crimped, but are instead sufficiently crimped to hold cable 34 in bracket 36C but allowing cable 34 to slide freely through cavity 64 of bracket 36C. Stops 68a, 63b are provided on cable 34 and are disposed on either side of bracket 36C to limit the sliding movement of bracket 36C relative to cable 34. When bows 20C and 20D are secured to cable 34 and tarpaulin 16, the system is operational.

In order to draw tarpaulin 16 over cargo hold 18 to cover a load therein, the operator activates a switch (not shown) to start motor 28. Motor 28 powers drive wheel 30 causing cable 34 to move in the direction of the arrows shown in FIG. 9. As cable 34 moves, bracket 36C allows cable 34 to slide along inside it until bracket 36C engages stop 68a. Any further movement of cable 34 causes bracket 36C to move with cable 34. This movement draws terminal bow 20C which is connected to bracket 36C, in the same direction as cable 34, thereby causing tarpaulin 16 to be drawn toward back end 14b of bed 14. Cable 34 will continue to move until stop 68a engages follower wheel 32. Because bow 20D is connected to tarpaulin 16 and is slidably engaged with cable 34, when tarpaulin 16 is drawn toward back end 14b of bed 14, bow 20D is also drawn toward back end 14b of bed 14 by tarpaulin 16. When cable 34 ceases to move, tarpaulin 16 covers cargo hold 18.

When the operator desires to move tarpaulin 16 in the opposite direction and uncover the load (not shown) in cargo hold 18, the switch (not shown) is activated in the opposite direction. This causes cable 34 to move in the direction of the arrows shown in FIG. 10. As cable 34 moves, bracket 36C allows cable 34 to slide along inside its cavity 64 until bracket 36C comes into engagement with stop 68b. Further movement of cable 34 causes bracket 36C to be moved with cable 34, causing terminal bow 20C to be drawn along with bracket 36C and thereby dragging tarpaulin 16 along with terminal bow 20C. As terminal bow 20C moves toward front end 14a of bed 14, it engages bow 20D. Further movement of cable 24 causes bow 20D and abutting terminal bow 20C to move in the same direction as cable 34. The section of tarpaulin 16 lying between bow 20D and 20C is caused to fold. Movement of cable 34 continues until bracket 36D engages assembly 22. At this stage, tarpaulin 16 has been drawn toward front end 14a of bed 14 and cargo hold 18 has been uncovered. A plurality of additional bows 20 may be positioned between terminal bow 20C and 20D. Each of these additional bows 20 function in a similar manner to bow 20D.

The present invention makes it easier to replace damaged bows 20. If a bow 20, positioned anywhere along the length of tarpaulin 16, breaks and needs to be replaced, the operator simply locates the damaged bow 20, disconnects bolts 56 and 46 on either end of bow 20, thereby detaching the same from the system. Bracket 36 remains attached to cable 34, the operator takes a replacement bow and reinserts bolts 56 and 46 so as to connect the replacement bow to tarpaulin 16 and to mounting flange 38. Bows 20 that are not damaged remain in position on tarpaulin 16 while the damaged bow is being replaced. Additionally, cable 34 is kept in the same position on drive wheel 30 and follower wheel 32 and the tension in cable 34 is maintained.

Tarpaulin system may also be repaired by replacing a damaged cable follower 40. In this instance, the operator locates the damaged cable follower 40, releases the cable follower 40 from cable 34 by prying edges 60a, 62a apart from each other so that the width of slot 66 is increased, draws cable follower 40 off cable 34 by allowed cable 34 to be pulled through slot 66. Bolt 46 is removed to detach bow 20 from bracket 36. A replacement cable follower is slid onto cable 34 so that cable 34 is received into the cavity 64 in the replacement cable follower 40. Upper and lower sections 60, 62 are crimped together so as to clamp cable 34 inside the replacement cable follower. If the cable follower of bracket 36C is being replaced, upper and lower sections 60, 62 would be crimped together so as to lock cable 34 within bracket 36C. If the cable follower of bracket 36D is being replaced, upper and lower sections 60, 62 would be crimped together so as to allow cable 34 to slide within bracket 36D. Bolt 46 is then inserted through second hole 42 and aperture 44 and is secured in place by nut 50.

While the preferred embodiment of the invention has been described above, variations may be made without departing from the spirit of the present invention. Bows 20 may be of any other suitable configuration desired such as substantially U-shaped, having a flat interior section for engaging tarpaulin 16 and two spaced-apart parallel side walls that extend downwardly from and perpendicularly to the interior section. Upper section 60 and lower section 62 of cable follower 40 may be integrally formed as is shown in FIG. 5, or may be formed as two separate sections that abut each other on one side. While mounting flange 38 and cable follower 40 are shown to be generally U-shaped and C-shaped respectively in the attached drawings, any other suitably configured mounting flanges and cable followers may be used to secure cable 34 to end 20b of bow 20. For example, mounting flange 38 may simply be a flat plate (i.e., without side walls 38b, 38c) or if end 20b of bow 20 is arrow-shaped, mounting flange 38 may be configured to be similarly arrow-shaped. In the same way, cable follower 40 may be two concavely-shaped sections that are connected together by bolts. Alternatively, the cable follower 40 may consist of a flat plat that clamps the cable to any part of mounting flange 38. Any suitable configuration of mounting flange and cable follower may be used without departing from the spirit of the present invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A tarpaulin system for covering an open-top cargo hold on a vehicle, the system comprising:
    a tarpaulin having first and second ends, the first end of the tarpaulin being fixedly connected proximate one end of the cargo hold;
    a plurality of bows for supporting said tarpaulin and moving said tarpaulin over the cargo hold, each of said bows having an interior section with opposing ends extending outwardly away therefrom;
    a plurality of fasteners for detachably securing said bows to said tarpaulin;
    a cable detachably secured for reciprocal movement adjacent the cargo hold;
    a plurality of connectors for releasably attaching said bows to said cable; wherein each connector is configured to be individually securable to and releasable from the cable when the cable is secured for movement.

2. The tarpaulin system as defined in claim 1, wherein the plurality of bows includes a terminal bow that is fixedly connected to the cable.

3. The tarpaulin system as defined in claim 2, wherein the plurality of bows further includes at least one intermediate bow that is slidably connected to the cable, said intermediate bow being positioned between the terminal bow and the first end of the tarpaulin.

4. The tarpaulin system as defined in claim 1, wherein each bow defines at least one first hole therein and the tarpaulin defines at least one eye therein; whereby the first hole of the bow is aligned with the eye in the tarpaulin; and one of the fasteners is received through the aligned first hole and eye to secure the tarpaulin to the bow.

5. The tarpaulin system as defined in claim 4, wherein the fastener comprises a bolt receivable through the aligned first hole and eye; and a nut for securing the bolt in the aligned first hole and eye.

6. The tarpaulin system as defined in claim 1, wherein each of the plurality of connectors includes a cable gripping area for attaching the connector to the cable and a bow attachment area for attaching the connector to the bow.

7. The tarpaulin system as defined in claim 6, wherein the cable gripping area of each connector comprises a cable follower for engaging the cable and the bow attachment area includes a bracket having a mounting flange for engaging an end of the bow.

8. The tarpaulin system as defined in claim 7, wherein the cable follower is fixedly attached to the cable, and the bracket is removably attached to the bow end.

9. The tarpaulin system as defined in claim 8, wherein the mounting flange has a longitudinal axis and the cable follower has a longitudinal axis; and the longitudinal axis of the mounting flange lies substantially perpendicular to the longitudinal axis of the cable follower.

10. The tarpaulin system as defined in claim 9, wherein the mounting flange is substantially U-shaped in cross-section.

11. The tarpaulin system as defined in claim 10, wherein the mounting flange has a base and spaced-apart parallel side walls that extend normal to and outwardly from the base and one of the ends of one of the bows rests on the base of the mounting flange and is confined between the side walls of the mounting flange.

12. The tarpaulin system as defined in claim 11, wherein each of the plurality of bows has a second hole therein spaced from the first hole; and the base of one of the mounting brackets has an aperture therein; and the aperture and second hole are axially aligned when the one end of the bow rests on the base of the mounting flange.

13. The tarpaulin system as defined in claim 12, wherein each connector further includes a bolt receivable through the aligned second hole and aperture; and a nut for engaging the bolt to secure the one end of the rib to the mounting flange.

14. The tarpaulin system as defined in claim 8, wherein the cable follower of each connector is substantially C-shaped in cross-section.

15. The tarpaulin system as defined in claim 14, wherein the cable follower of each connector comprises an upper section and a lower section which define a cavity therebetween; and the cavity lies substantially parallel to the longitudinal axis of the cable follower; and wherein the cable is received through the cavity of the cable follower.

16. The tarpaulin system as defined in claim 15, wherein each of the upper and lower sections have a terminal edge; and wherein the terminal edges of the upper and lower sections are substantially parallel and spaced apart and define a slot therebetween.

17. The tarpaulin system as defined in claim 16, wherein the slot lies substantially parallel to the longitudinal axis of the cable follower.

18. The tarpaulin system as defined in claim 17, wherein the upper and lower sections of the cable follower are selectively movable toward each other, whereby the width of the cavity between the upper and lower sections reduced to narrow the slot in the cable follower.

19. The tarpaulin system as defined in claim 1, further comprising a sleeve mounted on each end of each bow, the sleeve being manufactured from a material which reduces friction between an upper edge of the cargo hole and the ends of each bow.

20. The tarpaulin system as defined in claim 2, wherein the cable is detachably connected at a first end to the terminal bow and at a second end to the vehicle; and wherein the connectors are individually detachable from the cable without at least one of the first and second ends of the cable being detached from the terminal bow and the vehicle.

21. The tarpaulin system as defined in claim 1, wherein each connector is configured to be individually securable to and releasable from both the cable and the bow.

22. A method of repairing a damaged tarpaulin system for an open-top cargo hold for a vehicle, the method comprising the steps of:

providing a tarpaulin system which includes a tarpaulin; a plurality of bows for supporting said tarpaulin over the cargo hold; at least one cable detachably secured for reciprocal movement of the tarpaulin; and a plurality of connectors for detachably connecting said plurality of bows to said cable; wherein the connectors are individually releasably attachable to the cable;

locating a damaged bow within the tarpaulin system;

disengaging the connectors that attach the damaged bow to the cable when the cable is in its secured state;

withdrawing the damaged bow from the tarpaulin system;

providing an undamaged replacement bow;

attaching the undamaged replacement bow to the cable while maintaining the cable in its secured state.

23. The method of repairing a damaged tarpaulin system as defined in claim 22, further comprising the step of:

maintaining undamaged bows in position on the cable while the damaged bow is being replaced.

24. The method of repairing a tarpaulin system as defined in claim 22, further comprising the step of:

maintaining the position of the cable on a drive wheel and a follower wheel while the damaged bow is being replaced.

25. The method of repairing a tarpaulin system as defined in claim 22, further comprising the step of:

maintaining the tension on the cable while the damaged bow is being replaced.

* * * * *